United States Patent [19]

Sabatier

[11] Patent Number: 4,465,367

[45] Date of Patent: Aug. 14, 1984

[54] PROCESS AND DEVICE FOR MEASURING AND ADJUSTING OUT-OF-TRACK DISTANCES OF HELICOPTER ROTOR BLADES

[75] Inventor: Michel Sabatier, La Motte, France

[73] Assignee: L'Etat Francais, Paris, France

[21] Appl. No.: 317,927

[22] Filed: Nov. 3, 1981

[51] Int. Cl.$^3$ .......................... G01M 1/00; G01P 3/40
[52] U.S. Cl. ........................................ 356/23; 73/455
[58] Field of Search ........................... 356/23; 73/455

[56] References Cited

U.S. PATENT DOCUMENTS 1,877,713 9/1932 Beck ..................................... 356/23
2,964,849 12/1960 Roccati .................................. 356/23

Primary Examiner—F. L. Evans
Attorney, Agent, or Firm—Parkhurst & Oliff

[57] ABSTRACT

An apparatus and procedure for measuring and regulating the relative vertical displacement of helicopter blades from a rotational plane, comprising a stroboscopic illuminating means, intended to be directed across a reflective tape placed at the extremity of each blade, and a means for controlling the timing of the stroboscopic emissions, whereby the passage of a reflective tape, located at the extremity of each blade, through the line of sight of the lamp, permits a visualization of the relative positions of the different reflecting tapes, the apparatus may be used while on the ground or during flight.

12 Claims, 9 Drawing Figures

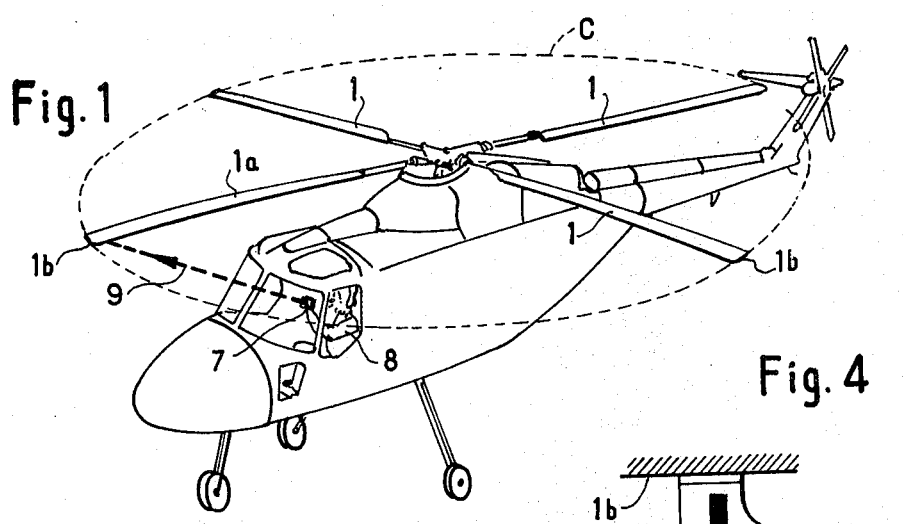
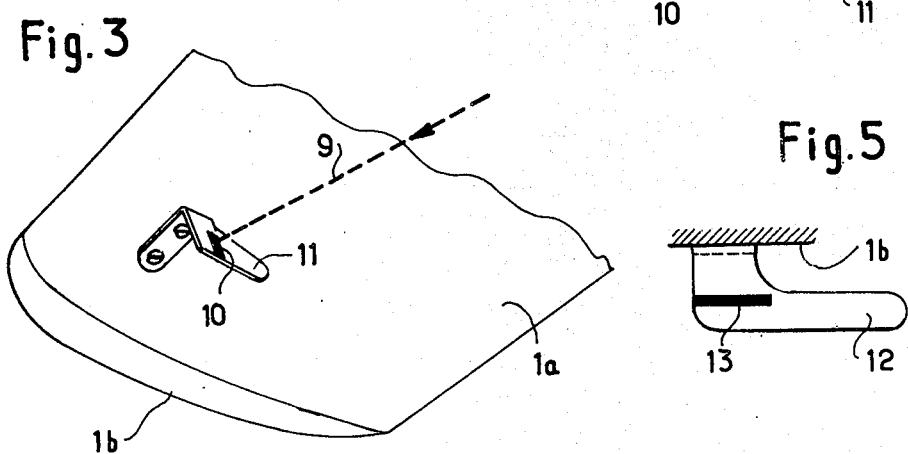
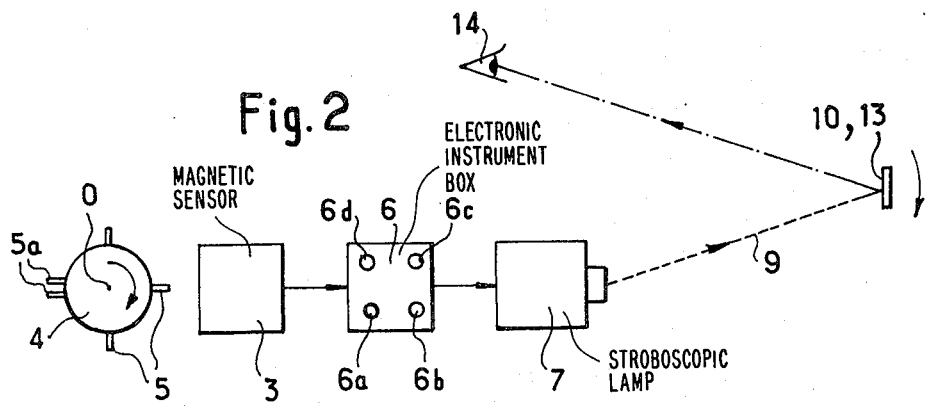

PROCESS AND DEVICE FOR MEASURING AND ADJUSTING OUT-OF-TRACK DISTANCES OF HELICOPTER ROTOR BLADES

BACKGROUND OF THE INVENTION

The present invention relates to a device for measuring and adjusting the out-of-track distances of helicopter rotor blades.

The invention also relates to a process for measuring and adjusting the out-of-track distances of helicopter rotor blades by using the aforesaid device.

In order to avoid any abnormal vibration of helicopter blades, it is important that the tips of the blades all rotate in the same plane. The track followed by the blades must therefore be precisely set.

The track can be coarsely adjusted as follows: marks of different colors are placed on the blade tips by means of chalks or felt pencils. The blades are turned and a piece of cloth (flag) is brought close to their tips. When the tips touch the cloth, traces of the said marks are transferred to the cloth providing a means of identifying any out-of-track distance. The track is adjusted from these distances by taking action on the respective lengths of the blade pitch control linkage.

This method has the drawbacks of lacking precision and of only being possible on the ground when there is little wind.

A more precise adjustment of blade track can be obtained by the following stroboscopic method: a stroboscopic lamp is held by an operator placed in the helicopter. The lamp is oriented in a fixed direction such that the blade tips cut the line along which the lamp aims and the lamp emits a ray of light whenever a blade tip passes through the line of aim of the lamp. Emission of the ray of light is controlled by a magnetic sensor that delivers electric signals by means of magnetic knife blades placed on a disk that is fitted to rotate on the rotor. The angular deviation between the knife blades is the same as that of the lift-blades, so that the position of the magnetic knife blades corresponds to that of the rotor blades. Moreover, each blade tip carries a reflecting target which is illuminated whenever it crosses through the ray of light emitted by the stroboscopic lamp, thus enabling the operator to distinguish the target. In order to distinguish between the targets, the target of each blade is of a different shape from that of the other blades. Given that the blades move at a speed greater than the perceptive ability of the eye of the operator, the operator distinguishes all the targets at the same time and can thus assess their relative positions which show the out-of-track distance of any blade in relation to the others.

The above stroboscopic method has the enormous advantage over the method described and based on a piece of cloth, in that it allows the blade tracks to be checked while the helicopter is flying.

Nevertheless, the method has a few drawbacks. Assessment of the relative position of the reflecting targets is in fact a delicate operation because the targets appear simultaneously in a very limited field of vision so that they are more or less superimposed on each other. Moreover, the need to give the targets distinct shapes is not conducive to precision of measurement so that the settings to which the measurements lead are not always very rigorously precise.

Furthermore, the greater the number of blades, the greater the difficulty for the operator to differentiate between the targets and of judging their relative positions. When a helicopter has six blades, the adjustment of blade track is therefore a very delicate operation. The same applies when a helicopter has less than six blades and when its design demands very low tolerances for blade track deviation distances.

SUMMARY OF THE INVENTION

The purpose of the present invention is to perfect the aforementioned drawbacks of the stroboscopic method by creating a device that provides for measuring and setting with ease and with great precision, the track deviations of helicopter blades.

The device covered by the invention comprises a stroboscopic lamp designed to be aimed at a reflecting target placed at the blade tips, and means for controlling the emission of a light ray by the stroboscopic lamp at every passage of a reflecting target of a blade in the line along which the lamp is aimed towards the target in order to provide a display of the position of the different targets.

According to the invention, the device is characterized by the fact that it includes means for providing a variable time shift of emission of the light rays relevant to the different blades, in order to prevent superimposition of the display of targets that fall in the line of aim of the strosboscopic lamp.

The reflecting targets thus appear off-set one from the other at distances that can be adjusted by the operator, instead of being superimposed in his field of vision. The operator can thus easily distinguish between the different targets and easily assess their relative position in relation to the target of the blade chosen as reference.

It is preferable, for this purpose, that the blade chosen as a reference should have a target of different shape from that of the targets of the other blades, which may be identical.

This is possible because of the fact that the targets can be off-set one from the other at adjustable distances thus obviating all risks of confusion by the operator.

According to an advantageous version of the invention, means are provided to off-set emission of light rays relative to the other blades, in an identical manner, in relation to the emission of light rays from the stroboscopic lamp in relation to the reference blade.

The target of the reference blade is therefore completely distinct from the targets of the other blades.

In order to allow better assessment of the relative position of the target of the reference blade, in relation to the other targets, it is preferable that the means for off-setting should include means for successively eliminating off-setting of the light ray relevant to the other targets in relation to emission of the light ray relevant to the reference target, so that it is possible to successively superimpose the other targets on the reference blade target.

The reflecting target placed on the blade chosen as a reference is preferably a vertical strip, and the targets on the other blades are identical horizontal strips.

These target shapes have the advantage of being simple and of allowing precise measurements of the relative position of the reference target in relation to each of the other targets.

In the event that the means provided for controlling emission of light rays from the stroboscopic lamp comprises a magnetic sensor and magnetic knife blades that are rotated by the rotor, as described in the above-introduction, a preferred version of the invention provides for inserting an electronic instrument box between the magnetic sensor and the stroboscopic lamp, enclosing an electronic circuit that comprises adjustable potentiometers associated with each blade, the potentiometers being designed to adjust the time shift between the signals received from the magnetic sensor and emission of the light ray from the stroboscopic lamp.

The operator can thus off-set the targets one from the other and successively superimpose them on the reference target, simply by acting on the potentiometers in the electronic instrument box.

The invention also covers a process for measuring and setting the out-of-track distances of helicopter blades that includes the use of a device that conforms to the present invention.

This process includes the following stages:
(a) The times of emission of the light rays from the stroboscopic lamp relative to the various blades excepting the reference blade, are off-set in order to separate the position of the reflecting target of the other blades in relation to the reference blade.
(b) The said off-set is eliminated for one of the blades in order to superimpose the corresponding target on that of the reference blade.
(c) The track distance is measured visually in accordance with the respective positions of the two targets.
(d) The target of the blade is again off-set with respect to the reference blade target.
(e) Stages b, c and d are repeated successively for the targets of the other blades.

Other particular features and advantages of the invention will appear from the description below:

BRIEF DESCRIPTION OF THE DRAWINGS

The above objects, features and advantages of the present invention will become more apparent from reading the following description of the preferred embodiments taken in connection with the accompanying drawings, wherein:

FIG. 1 is a perspective view of a helicopter in flight fitted with a device of the present invention.

FIG. 2 is a schematic view of the whole device of the present invention.

FIG. 3 is a perspective view of the tip of the reference blade of a helicopter and bears a reflecting target illuminated by a light ray transmitted by the stroboscopic lamp.

FIG. 4 is a front view of the reflecting target carried on the reference blade.

FIG. 5 is a front view of the reflecting target carried by each of the other blades.

DETAILED DESCRIPTION OF THE PREFERRED EMBODIMENTS

Figure 6:
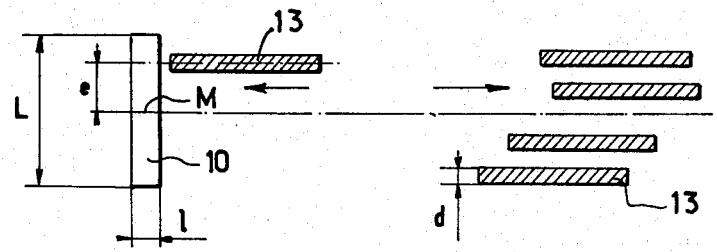
FIG. 6 is a schematic view that shows the relative position of the various targets that appear in the field of vision of the operator, four of the targets being separated from the reference target and one of the targets being brought substantially into juxtaposition with the reference target.

The present invention is described in detail with reference to the accompanying drawings which illustrate embodiments of the present invention. FIG. 1 illustrates the helicopter with three blades 1 and one blade 1a. During the rotation of blades 1 and 1a, the ends 1b of the blades formulate a circular trajectory. When the blade track is well adjusted, the ends 1b of the blades describe a single circle C. When such is not the case, that is to say when the ends 1b of blades 1 and 1a are displaced from the circle C, the track of the blades 1 and 1a must be adjusted by utilizing the device of the present invention which will be described below.

This device basically comprises (see FIG. 2) a magnetic sensor 3, which is placed inside the helicopter and opposite to a disk 4, the disk being fitted to rotate around an axis O of the rotor that carries the blades 1 and 1a. The disk 4 is fitted with radial magnetic knife blades 5 and 5a, in steel for example, at an angle of 90° from each other. The position of the magnetic knife blades 5 corresponds to that of blades 1. The position of double knife blade 5a corresponds to that of the blade chosen as a reference blade, 1a.

The magnetic sensor 3 is electrically connected by means of an electronic instrument box 6 to a stroboscopic lamp 7.

In the example shown in FIG. 1, the stroboscopic lamp 7 is carried by an operator 8 that is positioned inside the helicopter. Stroboscopic lamp 7 is directed towards the end 1b of the blade 1a so that a light ray 9 from the lamp 7 illuminates a reflecting strip 10 placed on a target 11 which is secured to the end 1b of blade 1a (see FIGS. 2, 3 and 4).

The other blades 1 also carry at their ends 1b, targets 12 each of which comprises a reflecting strip 13.

The aforedescribed device operates as follows.

Whenever a magnetic knife blade 5 or 5a passes in front of the magnetic sensor 3, the sensor emits an electric signal which actuates emission of the light ray 9 from the stroboscopic lamp 7. At the same time, the reflecting strip 13 on the target 12 carried at the end 1b of the blade 1, corresponding to a magnetic knife blade 5, intercepts the line of aim of the stroboscopic lamp 7 so that the reflecting strip 13 is illuminated by the light ray 9 from the lamp. An eye 14 of the operator 8 then distinguishes the shape of reflecting strip 13.

Given that the time of passage between two blades is very short (40 to 60 milliseconds), which is distinctly less than the time of visual perception, the operator 8 distinguishes all the reflecting strips 10 or 13 at the same time for the latter form and reform at a frequency which depends on the time of passage between the various blades.

In the ideal case, that is to say when the ends 1b of blades 1a and 1 rotate in a common circle C, the reflecting strips 10 and 13 are displayed to the operator 8 in a position of perfect superimposition one on the other.

When the track of blades 1a and 1 is not perfect, the operator 8 sees reflecting strips 10 and 13 more or less off-set from each other in a vertical direction.

In order to facilitate the display of reflecting strips 10 and 13 and to assess their relative positions to each other and, then, in order to adjust the track of blades 1 and 1a, the device of the present invention comprises an electronic instrument box 6 inserted between the magnetic sensor 3 and stroboscopic lamp 7.

The electronic instrument box 6 contains an electronic circuit details of which will be given below, referring to FIG. 8, that consists of potentiometers that can be adjusted by acting on buttons 6a, 6b, 6c and 6d that are associated with the helicopter blades. The potentiometers provide a variable time shift for the emission of the light ray from the stroboscopic lamp 7 for each of blades 1a and 1.

The operator is therefore able to separate reflectng strips 10 and 13 from each other, simply by acting on the potentiometers, to a distance that is adjustable so that he can easily distinguish one from the other.

Reflecting strips 10 and 13 may be of a simple shape as is illustrated in FIGS. 3 to 7.

In the illustrated example, the reflecting strip 10 secured to the target 11 of the blade 1a, chosen as reference, is a vertically positioned rectangle of length L that is between one and two times longer than the maximum track deviation tolerance, and is of a width l equal to 2/10ths of the length L.

The reflecting strips 13 secured to the targets 12 of the other blades 1 are all identical having the same horizontal rectangular shape of equivalent widths "d", being between 1/10th and 2/10th is of the length L.

An example of the electronic circuit in the instrument box 6, which is designed to provide a time shift for the emission of light rays from the stroboscopic lamp 7 in order to separate the reflecting strips 13 of the blades 1 in relation to the reflecting strip 10 of the reference blade 1a is hereafter described.

The circuit comprises an input 14 that receives electric signals from the magnetic sensor 3. The input 14 is connected to a monostable trigger circuit 15, which has a time constant set to approximately 500 microseconds. The trigger circuit 15 is connected to one of the inputs 16 of a NAND gate 17, the output of which is connected to the "zero reset" input 18 of a shift register 19. The trigger circuit 15 is connected to a second monostable trigger circuit 20, which has a time constant set to 2.3 milliseconds. The second trigger circuit 20 is connected to another input 21 on the NAND gate 17 and to the base of a transistor 22. A third monostable trigger circuit 23, which has a time constant set to 60-80 milliseconds receives as an input, the output 24 of the NAND gate 17, and output to the shift register 19. The transistor 22 is connected to a capacitor 26 which is itself connected to the input 27 of a Schmitt trigger circuit 28, which has a time constant set to 150 microseconds.

Furthermore, the capacitor 26 is connected to a series of adjustable potentiometers 29, 30, 31 and 32 corresponding to each of the blades 1 and 1a of the helicopter, which are themselves connected to outputs S1, S2 and S3 of the shift register 19 by means of diodes 33, 34, 35 and 36. The potentiometer 32, assigned to the reference blade 1a, is also connected to the shift register 19 by a monostable trigger circuit 37, 38 and 39 which has a time constant set approximately to 23 milliseconds.

Figure 8:
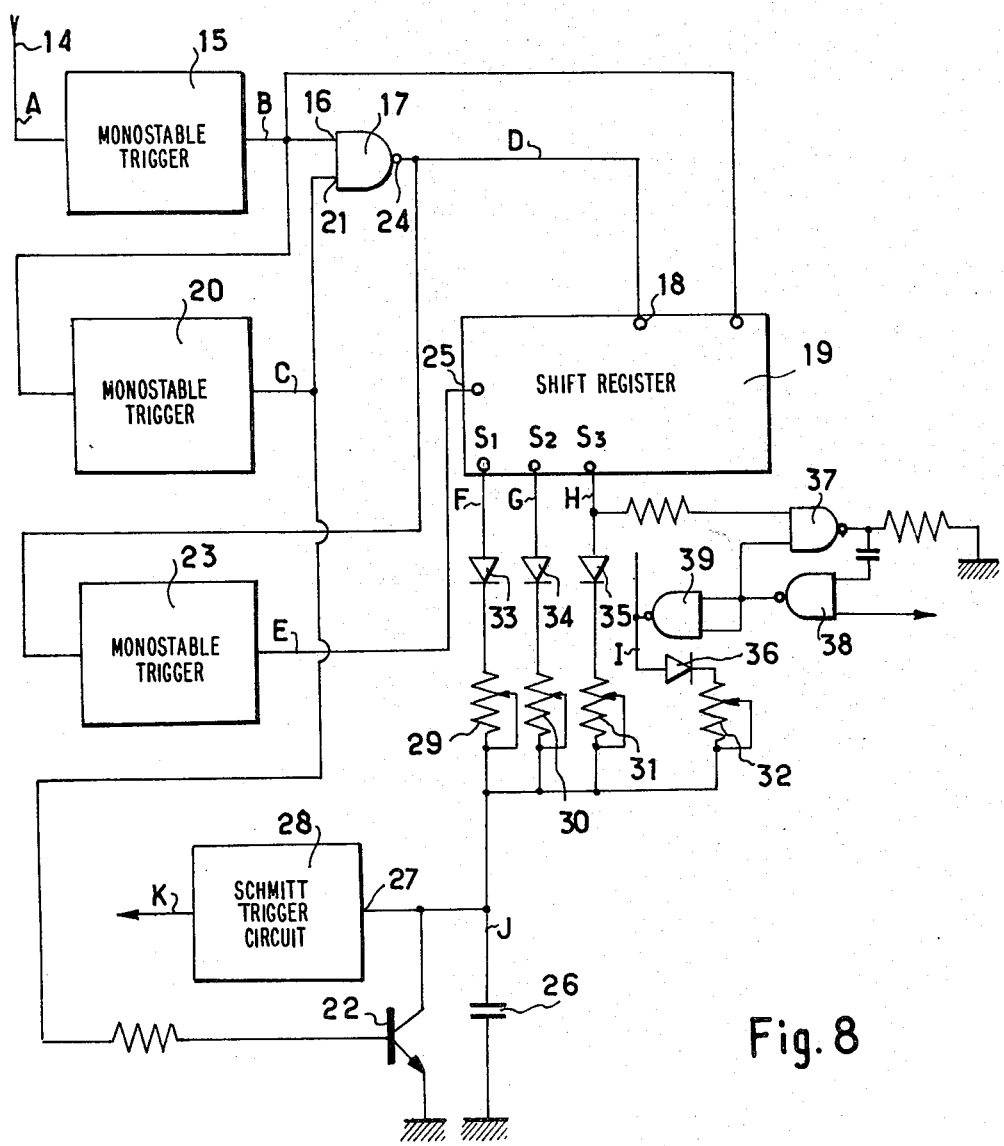
FIG. 8 is a schematic view of the electronic circuit contained in the target offset instrument box of the device according to the present invention.
Figure 9:
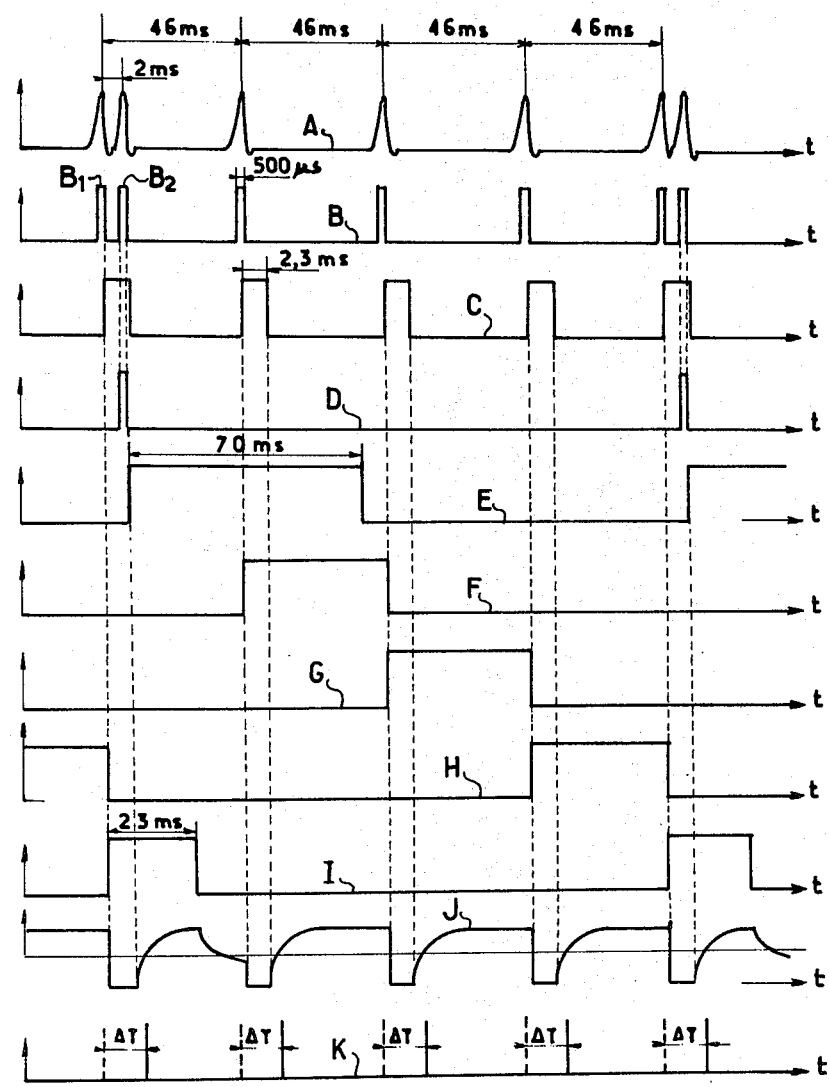
FIG. 9 is a view of the electric signals taken at various points of the electronic circuit shown in FIG. 8.

The electronic circuit described above operates as follows:

Curves A to K in FIG. 9 illustrate the signals emitted at the various points of the electronic circuit and designated by the corresponding letters in FIG. 8.

A signal (curve A of FIG. 9) from the magnetic sensor 3 is applied to the input of the trigger circuit 15 that transforms the signal A into a square wave B (curve B of FIG. 9) having an amplitude equal to, for example, 5 volts, and of a width that corresponds to the time constant of the trigger circuit 15, that is to say to 500 microseconds.

The square wave B is then applied and becomes the input to the monostable trigger circuit 20 and to the input 16 of the NAND gate 17.

The trigger circuit 20 transmits a signal C (see curve C) of a width equal to 2.3 milliseconds which becomes an input to the NAND gate 17 at the input 21, and to the base of the transistor 22.

At the meeting point between the double square wave B1-B2, corresponding to the reference blade 1a, and the square wave C, the output of the NAND gate 17 passes to a zero state. The square wave D (curve D of FIG. 9) results and is applied to the input 18 (zero reset) of the shift register 19 and to the input of the monostable trigger circuit 23. (Note that the time of passage between two blades 1a and 1 is between 40 and 60 milliseconds).

The time pip (square wave B) produced by blade 1 that follows the reference blade 1a, must be emitted when the input 25 of the shift register 19 is at level 1 in order to shift a positive squarewave from monostable trigger circuit 23, into the shift register 19. The input 25 must also be zero at the moment of the time pip of the second blade 1, following the reference blade 1a, otherwise both outputs will be zero. The input 25 of the shift register 19 must be prepositioned, for the purpose, on the basis of the falling front of the square wave C for a certain time so that it is shorter than the passage time of three blades spaced out at the shortest time and longer than the passage time of two blades spaced out at the longest time.

Therefore, the time constant of the monostable trigger circuit 23 must lie between 60 milliseconds and twice 40 milliseconds, i.e. 70 milliseconds approximately (since the time of passage between the two blades lies between 40 and 60 milliseconds).

Square wave E (see curve E) is of a duration of 70 milliseconds and is produced by the monostable trigger circuit 23 on the basis of the falling front of the zero-reset pulse from the NAND gate 17. The square wave E is then applied to the input 25 of the shift register 19 while awaiting passage of the blade 1 that follows the reference blade 1a. The time pulse of the blade 2 arrives at the output S1 at zero state.

A capacitor 26 is then charged through a diode 33 and a potentiometer 29. The charge voltage of the capacitor 26 is applied to an input 27 of a trigger circuit 28. When the charge potential of the capacitor 26 reaches the setpoint of the trigger circuit 28, the trigger circuit emits a positive pulse of time equal to 150 microseconds.

The time lag DT between this pulse and the time pulse depends on the position of potentiometer 29.

The next time pulse, corresponding to the third blade 1, arrives at the output S2 of the shift register 19 and to zero state, the output S1 again passes to the zero state and the capacitor 26 is discharged. At the end of the time of discharge of capacitor 26, it is recharged through the diode 34 and the potentiometer 30.

The same applies to the time pulse of the fourth blade. After the passage of the reference blade 1a, the first square wave B1 from the double pulse causes the output of the register 19 to return to zero which triggers the monostable trigger circuit consisting of 37, 38 (time constant equal to 23 milliseconds) and inverser 39.

The capacitor 26 is then charged through the diode 36 and the potentiometer 32 without being affected by arrival of the second square wave B2 of the double signal caused by the reference blade, and leading to a zero resetting of the register 19.

The trigger circuit 37, 38 and 39 therefore gives rise to a square wave that provides a means of varying the time lag of the pulse corresponding to the reference blade, the square wave being synchronized with the double pulse B1 and B2.

Adjustment of the helicopter blade track can be effected as follows, by means of the device of the present invention.

The horizontal strips 13 on blades 1 are separated from the vertical strip 10 on the reference blade 1a by adjusting the potentiometers 29, 30, 31 and 32 that are associated with blade 1a and blades 1, respectively. This provides a means for fully distinguishing the vertical strip 10 from the other horizontal strips 13.

One of the horizontal strips 13 (see FIG. 6) is then brought towards vertical strip 10, by acting on one of the potentiometers, until the two strips are superimposed. It is easy, in this position, to visually measure the distance e between the position of horizontal strips 13 and the middle point M of vertical strip 10.

When measurement is completed, the horizontal strip 13 is separated and the same operation is performed for the other separated strip 13 that need to be measured.

Figure 7:
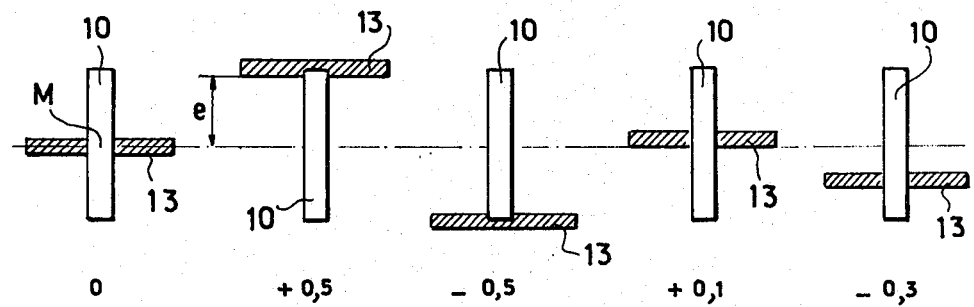
FIG. 7 is a schematic view showing the relative successive positions of the reference target in relation to the other targets after the off-set between the reference target and the other targets has been eliminated.

FIG. 7 shows, as an example, the relative positions of the different horizontal strips 13 of blades 1 in relation to the vertical strip 10 of reference blade 1a. It can be seen, from these relative positions, that the out-of-track distance e of the first blade in relation to the reference blade 1a is negligible but the other distances are successively equal to +0.5 L, −0.5 L, −0.1 L and 0.3 L for the other blades when L is, as has been said above, the length of the reflecting strip 10 of reference blade 1a. These figures are estimated to within ±0.1 L.

The blade tracks are adjusted, from these distances measured, traditionally by adjustments on the respective lengths of the blade pitch linkages.

The precision of the adjustment obtained by the device covered by the invention provides a means of considerably reducing vibration levels caused by rotation of the blades and this is favorable to the mechanical lifetime of the helicopter structures, to the reliability of any on-board equipment and adds comfort to the crew. Furthermore, measurements can be effected during flight and also on the ground.

The invention is, of course, not limited to the example that has been described and a number of modifications can be applied to it without leaving the scope of the invention.

Hence, the electronic instrument box 6 may include a rotary switch that allows the box to be rendered transparent to signals emitted by magnetic sensor 3 and, thus, it does not off-set the relevant blade targets. This arrangement particularly provides for verification of correct operation of the blade drag dampers.

Furthermore, the different time constants of the electronic circuit components in the electronic instrument box 6 can be modified depending on the type of helicopter.

Furthermore, adjustable electronic components other than potentiometers can be designed to time-shift the signals emitted by magnetic sensor 3.

Additionally, the magnetic sensor 3 can also be replaced by any other sensor able to transmit a signal in synchronization with the blade rotation.

I claim:

1. A device for measuring and adjusting the rotational plane of helicopter blades, comprising:
   at least one reference reflecting target located adjacent to the outer tip of at least one reference helicopter blade and at least one regular reflecting target located adjacent to the outer tip of at least one regular helicopter blade;
   a stroboscopic illuminating means for illuminating the reference reflecting target and the regular reflecting target while the blades are in rotary motion, thereby visually freezing an image of the reflecting targets at some position in space;
   electronic control means for cueing the stroboscopic illuminating means, the electronic control means comprising;
   a disk adapted for attachment with a rotational shaft of the helicopter blades, the disk having a plurality of radial magnetic extensions extending beyond the peripheral edge of the disk;
   magnetic sensor means for detecting the radial magnetic extensions when rotating with the shaft of the helicopter blades, the magnetic sensor means being located adjacent to the disk;
   electronic circuit means for converting an output of the magnetic sensor means into a signal for cueing the stroboscopic illuminating means to illuminate the reflecting targets and having an adjustment means for time-varying the cueing signal to the stroboscopic illuminating means.

2. The device of claim 1, wherein said reference reflecting target and said regular reflecting target comprises an attachment means for attaching to the helicopter blade near the radial tip and a reflecting means located on the attachment means.

3. The device of claim 2, wherein the reflecting means for said reference reflecting target comprises a vertically positioned strip of reflecting material and the reflecting means for said regular reflecting target comprises a horizontally positioned strip of reflecting material.

4. The device of claim 3, wherein the vertically positioned strip of reflecting material has a vertical length which is at least equivalent to a maximum tolerance by which any one of the radial tips of the helicopter blades may be vertically displaced.

5. The device of claim 4, wherein the horizontally positioned strip of reflecting material has a vertical thickness between 1/10th and 1/5th the vertical length of the vertically positioned strip of reflecting material.

6. The device of claim 1, wherein the electronic control means is capable of superimposing an image of at least one regular reflecting target upon an image of at least one reference reflecting target by using a time-varying cueing signal to the stroboscopic illuminating means.

7. The device of claim 1, wherein the radial magnetic extensions are radially located at positions which correspond to the relative positioning of the helicopter blades.

8. The device of claim 7, wherein there are two radial magnetic extensions which correspond to the relative position of the reference helicopter blade.

9. The device of claim 1, wherein the adjustment means for time-varying the cueing signal comprises a plurality of adjustable potentiometers connected to the stroboscopic illuminating means.

10. The device of claim 1, wherein the electronic circuit comprises;

an output from the magnetic sensor means;
a first monostable trigger circuit means for receiving the output of the magnetic sensor means;
a second monostable trigger circuit means for receiving an output of the first monostable trigger circuit;
a gate means for simultaneously receiving the output of the first monostable trigger circuit and an output from the second monostable trigger circuit;
a shift register means for receiving an output of the gate;
a third monostable trigger circuit means for receiving the output of the gate;
the shift register having a means for additionally receiving the output of the first monostable trigger circuit and an output of the third monostable trigger circuit means;
a plurality of diodes having a means for receiving outputs from the shift register means, the output corresponding to a relative position of said regular helicopter blade;
a plurality of variable potentiometers having a means for receiving the outputs of the diodes;
at least one fourth monostable trigger circuit means for receiving one of said outputs from the shift register means, corresponding to a relative position of said reference helicopter blade;
at least one diode having a means for receiving an output of said fourth monostable trigger circuit means;
at least one variable potentiometer having a means for receiving an output of said diode which receives the output of the fourth monostable trigger circuit means;
at least one capacitor means for receiving the output of any one of said variable potentiometers;
a trigger circuit means for receiving an output of the capacitor means when the capacitor means reaches a set point of the trigger circuit means;
a transistor having a base portion for receiving the output of the second monostable trigger and a collector portion for receiving the output of the capacitor means; and
means for transferring an output of the trigger circuit means into a stroboscopic flash.

11. The device of claim 1, wherein the electronic circuit comprises;
an output from the magnetic sensor means;
a first monostable trigger circuit having a time constant of approximately 500 micro seconds, for receiving the output of the magnetic sensor means;
a second monostable trigger circuit means, having a time constant of approximately 2.3 milliseconds, for receiving an output of the first monostable trigger circuit;
a gate means for simultaneously receiving the output of the first monostable trigger circuit and an output from the second monostable trigger circuit;
a shift register means for receiving an output of the gate at a zero-reset input;
a third monostable trigger circuit means, having a time constant between 60 milliseconds and eighty milliseconds, for receiving the output of the gate;
the shift register having a means for additionally receiving the output of the first monostable trigger circuit and an output of the third monostable trigger circuit means;
a plurality of diodes having a means for receiving outputs from the shift register means, the output corresponding to a relative position of said regular helicopter blade;
a plurality of variable potentiometers having a means for receiving the outputs of the diodes;
at least one fourth monostable trigger circuit means, having a time constant of approximately 23 milliseconds, for receiving one of said outputs from the shift register means, corresponding to a relative position of said reference helicopter blade;
at least one diode having a means for receiving an output of said fourth monostable trigger circuit means;
at least one variable potentiometer having a means for receiving an output of said diode which receives the output of the fourth monostable trigger circuit means;
at least one capacitor means for receiving the output of any one of said variable potentiometers;
a trigger circuit means for receiving an output of the capacitor means when the capacitor means reaches a set point of the trigger circuit means;
a transistor having a base portion for receiving the output of the second monostable trigger and a collector portion for receiving the output of the capacitor means; and
means for transferring an output of the trigger circuit means into a stroboscopic flash.

12. A process for measuring and adjusting the rotational plane of helicopter blades, comprising;
(a) stroboscopically illuminating reflective areas located near the outer tips of reference helicopter blades and regular helicopter blades;
(b) triggering the stroboscopic illuminating of reflective means to illuminate one or more of the reflective areas;
(c) stroboscopically illuminating a vertically positioned reflective area on at least one reference helicopter blade;
(d) stroboscopically illuminating a horizontally positioned reflective area, on at least one regular helicopter blade;
(e) superimposing the horizontally positioned reflective area upon the vertically positioned reflective area using adjusting means for time-varying an electronic control circuit which triggers the stroboscopic illumination means;
(f) visually comparing the relative position of the horizontally positioned reflective area on the regular blade with the vertically positioned reflective area on the reference blade;
(g) adjusting the rotational plane of the regular blade until the horizontally positioned reflective area bisects the vertically positioned reflective area;
(h) cancelling the visual super position of the horizontally positioned reflective area on the vertically positioned reference area by reversely adjusting the time-varying electronic control circuit;
(i) superimposing a second horizontally positioned reflective area of a second regular blade upon the vertically positioned reflective area of the reference blade by readjusting the time-varying electronic circuit, and adjusting the rotational plane of the second regular blade;
(j) repeating steps (e)-(g) until all of the helicopter blades tips are adjusted to rotate in substantially the same plane.

* * * * *